United States Patent
Cardone et al.

(10) Patent No.: US 8,230,027 B2
(45) Date of Patent: Jul. 24, 2012

(54) METHOD AND APPARATUS FOR UTILIZING PORTABLE E-MAIL ADDRESSES

(75) Inventors: Richard J. Cardone, Mahopac, NY (US); Steven J. Mastrianni, Unionville, CT (US); Alpana Tiwari, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 648 days.

(21) Appl. No.: 12/133,495

(22) Filed: Jun. 5, 2008

(65) Prior Publication Data

US 2008/0235330 A1 Sep. 25, 2008

Related U.S. Application Data

(63) Continuation of application No. 11/429,607, filed on May 5, 2006, now abandoned.

(51) Int. Cl.
G06F 15/16 (2006.01)
(52) U.S. Cl. ....................................................... 709/206
(58) Field of Classification Search ........... 709/204–207
See application file for complete search history.

(56) References Cited

U.S. PATENT DOCUMENTS

| | | | |
|---|---|---|---|
| 6,963,929 B1 | 11/2005 | Lee | 709/245 |
| 7,200,637 B2 | 4/2007 | Klos et al. | 709/206 |
| 7,558,827 B2 * | 7/2009 | Kawashima et al. | 709/206 |
| 2002/0120693 A1 * | 8/2002 | Rudd et al. | 709/206 |
| 2002/0133573 A1 | 9/2002 | Matsuda et al. | 709/220 |
| 2003/0200334 A1 | 10/2003 | Grynberg | 709/245 |
| 2004/0249911 A1 | 12/2004 | Alkhatib et al. | 709/223 |
| 2004/0249973 A1 | 12/2004 | Alkhatib et al. | 709/245 |
| 2005/0198158 A1 | 9/2005 | Fabre et al. | 709/206 |
| 2006/0085505 A1 | 4/2006 | Gillum et al. | 709/206 |
| 2007/0005713 A1 | 1/2007 | LeVasseur et al. | 709/206 |
| 2007/0011245 A1 * | 1/2007 | Kawashima et al. | 709/206 |
| 2007/0050454 A1 | 3/2007 | Zanter | 709/206 |
| 2007/0198640 A1 | 8/2007 | Kawakami et al. | 709/206 |
| 2008/0062895 A1 | 3/2008 | Chapman et al. | 370/270 |
| 2008/0235330 A1 | 9/2008 | Cardone et al. | 709/203 |

FOREIGN PATENT DOCUMENTS

| | | |
|---|---|---|
| JP | 2001243133 (A) | 9/2001 |
| JP | 2002190820 (A) | 7/2002 |
| JP | 2003-186804 A | 7/2003 |
| JP | 2003249963 (A) | 9/2003 |
| WO | WO 2005/039130 A1 | 4/2005 |
| WO | WO 2005039130 A1 * | 4/2005 |

OTHER PUBLICATIONS

Klensin, Standards Track, "Simple Mail Transfer Protocol", Apr. 2001, RFC 2821, The Internet Society.

* cited by examiner

Primary Examiner — Ian N Moore
Assistant Examiner — Kiet Tang
(74) Attorney, Agent, or Firm — Harrington & Smith (57) ABSTRACT

A signal bearing medium tangibly embodies a program of machine-readable instructions executable by a digital processing apparatus to perform operations comprising receiving an email message having an extended email address encoded virtual address, resolving said address to an actual email address, replacing the virtual address with the actual email address, and transmitting said email message.

12 Claims, 5 Drawing Sheets

METHOD AND APPARATUS FOR UTILIZING PORTABLE E-MAIL ADDRESSES

CROSS REFERENCE TO RELATED APPLICATION

This application is a continuation of U.S. patent application Ser. No. 11/429,607 filed May 5, 2006 now abandoned.

TECHNICAL FIELD

The present invention generally concerns electronic mail and electronic mail systems, and more particularly concerns a method and apparatus for enabling the portability of email addresses on the Internet.

BACKGROUND

Electronic mail has become an important communications medium that few can do without. Today's global business climate requires users to contact each other across continents and time zones, to conduct business transactions, and to share information. Email allows users to send or receive communications anytime, day or night, whether or not the recipient is immediately available. The recipient simply checks their email when it becomes convenient.

Internet email is addressed with industry standard syntax that specifies the user name separated by the '@' sign, followed by the domain name of the user's email provider or email server. The general form is user@domain. The domain portion of an e-mail address is specified by the Internet Service Providers (ISP), which can be employers, governments or private telecommunication providers that sell Internet services to individuals and organizations. One problem that arises from implementing this email address format is that the user's email address will change if the email account is hosted by another provider.

It is common for e-mail users to switch ISPs because of changes in affiliation or changes in the marketplace. When an e-mail user switches ISPs, the old ISP usually deletes the user's e-mail address and e-mail account. In addition, the new ISP creates a new e-mail address and account for the user. The old and new e-mail addresses have to be different because the two ISPs control different Internet domains and the names of these domains are used in e-mail addresses that they manage.

Various attempts have been made to mitigate the effects of changes to user identities on existing networks. For example, pending U.S. Patent Application No. 20040249911A1 describes the construction of virtual networks for computing devices attached to public and private networks. Such virtual networks are directed to allowing computing devices, regardless of their physical location, to be joined together in a private intranet and to communicate with each other. However, such systems fail to address problems which arise in a dynamic environment where service providers and email servers are subject to change. In such instances, it is desired that email addresses remain constant even if the provider or email server changes.

SUMMARY OF THE INVENTION

The foregoing and other problems are overcome, and other advantages are realized, in accordance with the exemplary embodiments of these teachings.

In accordance with an exemplary embodiment of the invention, a signal bearing medium tangibly embodies a program of machine-readable instructions executable by a digital processing apparatus to perform operations including receiving an email message having an extended email address encoded virtual address, resolving said address to an actual email address, replacing the virtual address with the actual email address, and transmitting said email message.

In accordance with another exemplary embodiment of the invention, a signal bearing medium tangibly embodies a program of machine-readable instructions executable by a digital processing apparatus to perform operations including receiving an email message having an actual email address, resolving the address to an extended email address encoded virtual address, and replacing the actual address with the virtual email address, and transmitting the email message to an email client.

In accordance with another exemplary embodiment of the invention, a server includes an element for receiving an email message having an extended email address encoded virtual address, an element for resolving the address to an actual email address, an element for replacing the virtual address with the actual email address and an element for transmitting the email message.

BRIEF DESCRIPTION OF THE DRAWINGS

The foregoing and other aspects of these teachings are made more evident in the following Detailed Description, when read in conjunction with the attached Drawing Figures, wherein.

DETAILED DESCRIPTION

In exemplary embodiments of the invention there are described an apparatus and method for providing virtual or portable email addresses that do not require change should the user switch email providers or hosting services. The exemplary embodiments provide a mechanism to allow the portability of email addresses without regard to the email provider or network domain name. In contrast to existing provider-based email forwarding systems, the invention provides email forwarding absent a reliance on a particular hosting system or Internet service provider (ISP). Typical email forwarding provides a work-around to the problem of address portability but relies on a forwarding service to be operational to prevent the interruption of service. A typical email forwarding service accepts email messages at one address and then simply retransmits the messages, including their attachments, to another email address. In one exemplary embodiment of the invention, the invention translates the email addresses using a certificate-based persistent store and/or industry-standard plug-in components, thereby alleviating the need for a high availability forwarding service normally associated with an email forwarder.

Exemplary embodiments of the invention can also be applied to e-mail systems other than the Internet e-mail system, including e-mail systems that use Internet standards and protocols on private networks and e-mail systems that use proprietary addressing schemes. In addition, exemplary embodiments of the invention can be applied to other kinds of communication systems, such as instant messaging systems, in which users are identified by names that are tied to a logical or physical network location.

In an exemplary embodiment of the invention, industry standard plug-in code runs on the sending client's platform. In another exemplary embodiment, industry standard compliant plug-in code runs on a server platform or platforms, in addition to or instead of running on the sending client's platform. In yet another exemplary embodiment, industry standard plug-in code runs on the receiving client or server platforms, in addition to running elsewhere.

Specifically an industry standard "plug-in" software component extends the functionality of existing email clients and email servers. The client plug-in intercepts outbound mail, removes the recipient's virtual email address and replaces it with the recipient's actual address. The process of mapping a virtual email address to an actual email address is called "virtual address resolution". The actual address may reside in a persistent store accessible to the plug-in, or may be configured based on a formula, digital certificate, or random seed.

As described more fully below, a persistent store contains the translation method and/or address lookup table. The persistent store may reside on an intranet or Internet server, network storage device, flash ram, memory stick, or any type of persistent storage device. Access to the store may or may not be restricted. Unrestricted access allows any client plug-in to access the persistent store and to resolve virtual addresses into actual addresses. Restricted access may be granted to client plug-ins that exchange a valid digital certificate with the server or one authenticated in any other way. The certificate may be obtained in any one of several ways, including being supplied on media, downloaded, or sent to the parties via email. After the server validates the certificate and resolves the virtual address, that virtual address is changed to the user's real email address and sent. The mail server validates the user's ID and sends the email out on the network. The recipient mail server receives the valid mail address, and performs the reverse method to change the user's real email address back to the user's virtual address.

In another aspect of the invention, the virtual address may provide portability in any communication service that distinguishes users with a name, address or identifier. For example, instant messaging systems allow users to contact one another using assigned names. These names can be virtualized using a client plug-in similar to the email case described above. The instant messaging client plug-in intercepts outgoing messages, resolves virtual names to actual names, replaces virtual names in messages with actual names, and then transmits the messages using normal methods. The teachings of the invention apply to both Internet and non-Internet email systems. Examples of non-Internet email systems include, but are not limited to, proprietary email systems like Lotus® Notes®.

Because the invention uses industry-standard components and extensions, the invention does not require modification to existing email address formats or syntax, nor does the invention require any programming modifications to the client or server email components. The components are instead installed using standard operating system utilities that allow for extending the capabilities of email programs.

Figure 1:
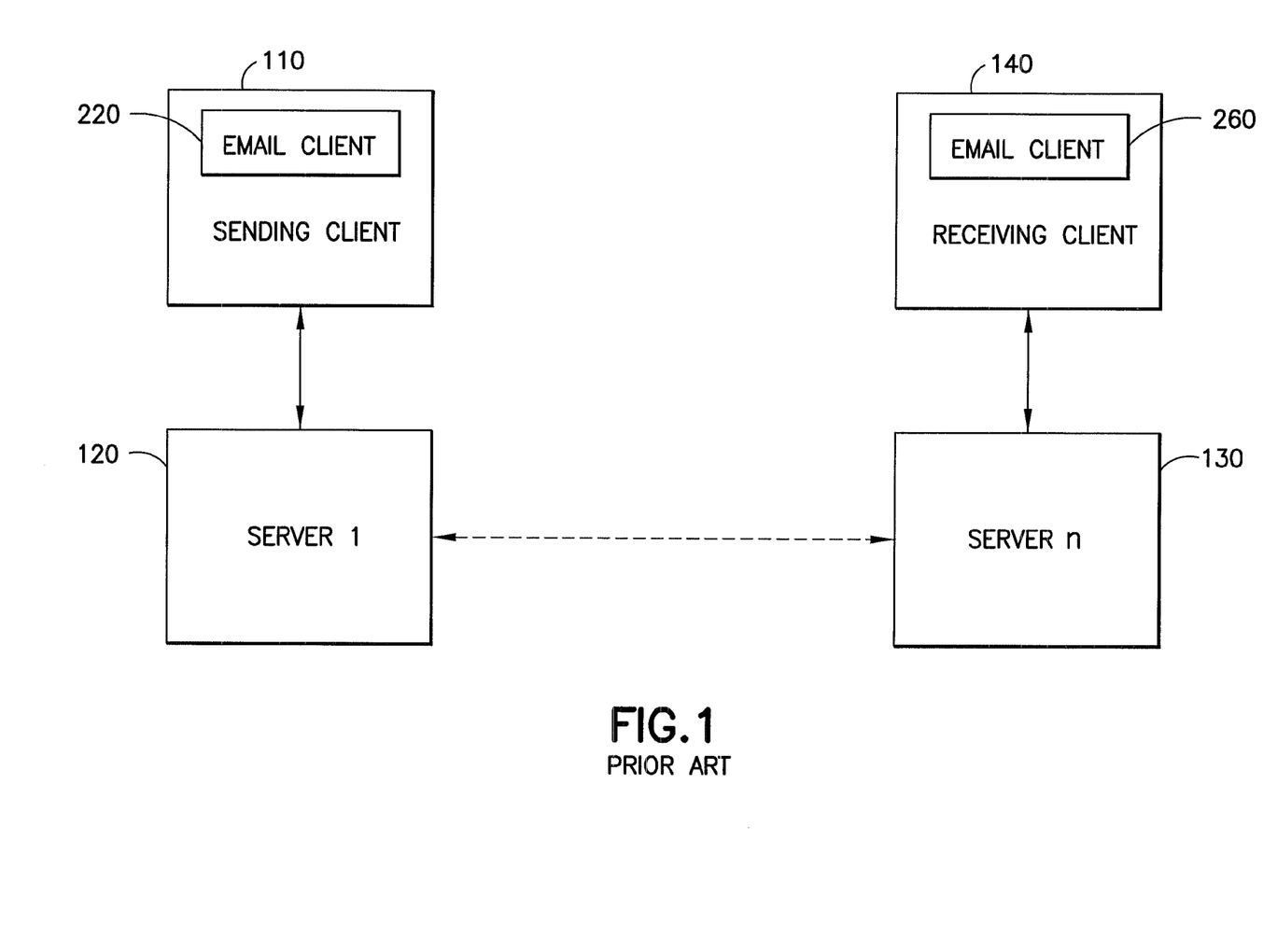
FIG. 1 is a diagram of a communication system known in the art by which a sending client and a receiving client communicate with each other via one or more intermediate servers.

With reference to FIG. 1, there is illustrated a standard architecture known in the art for sending and receiving email messages. Sending client platform 110, receiving client platform 140, and email servers 120, 130 are computing devices, including, but not limited to, personal computers, mainframe computers, personal digital assistants, and the like. Client platforms 110, 140 and email servers 120, 130 include a processor for accessing, manipulating, and outputting digital data, memory, such as RAM, ROM, and magnetic storage devices for storing data in a computer readable format, and can include input and output entities for entering and displaying, respectively, data. An email client 220 operating or otherwise executed on client platform 110 creates an email message and forwards it to email server 120, also known as a Mail Transfer Agent. The email message is forwarded to email server 130. During passage, the email message can travel through one or more intermediate servers (not shown). Using existing and well known protocols, the email client 260 running on the receiving client platform 140 can retrieve the email message. At each point along its journey, the email message is transmitted from platform to platform via a digital data communication link, including wired and wireless connections between the clients 110, 140 and servers 120, 130.

Figure 2:
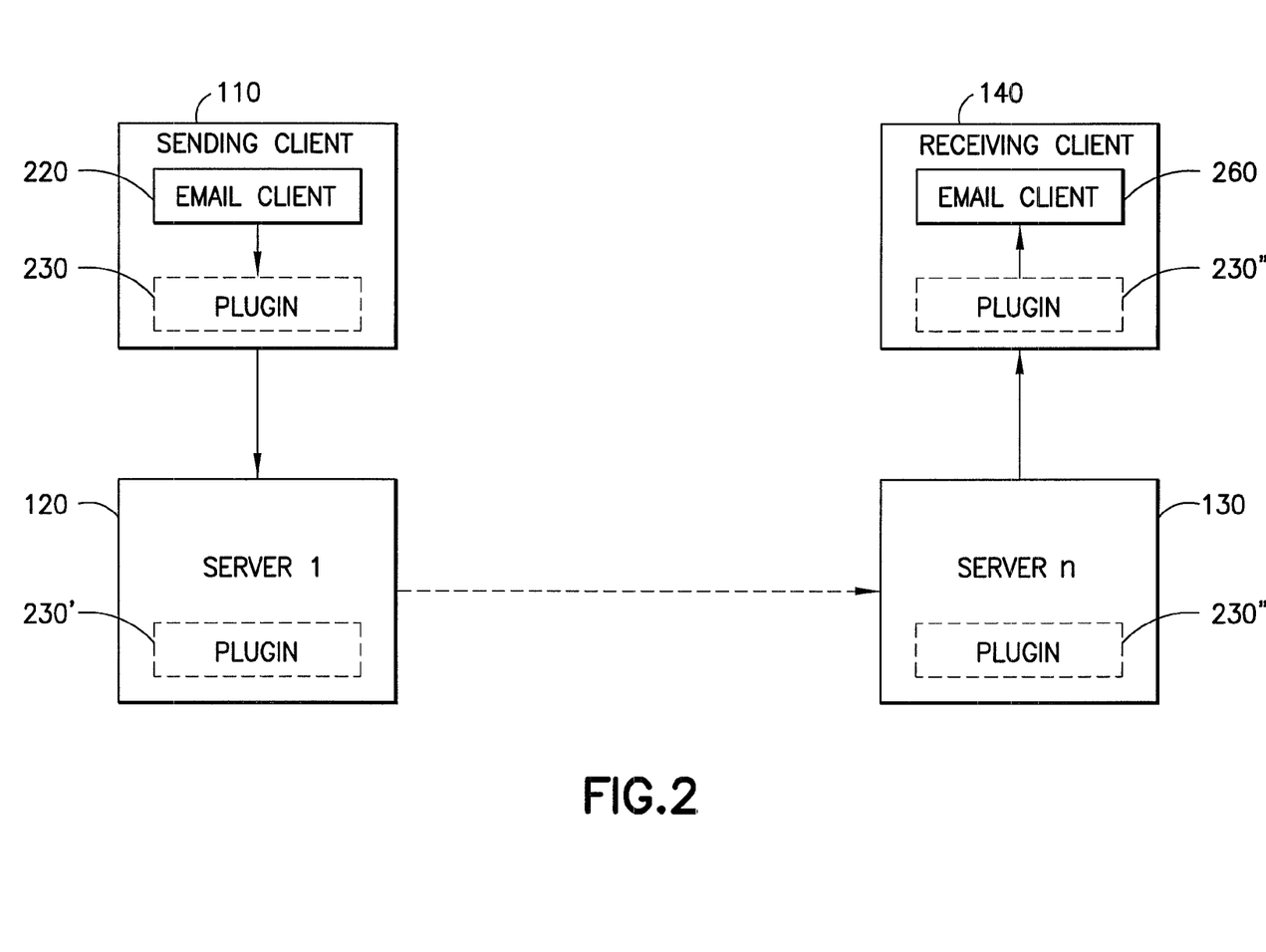
FIG. 2 is a diagram of exemplary embodiments of the invention showing various placements of the plug-in software.

With reference to FIG. 2, there is illustrated an exemplary embodiment of the invention whereby an industry standard plug-in code 230 runs on the sending client's platform 110. Email messages are created on the sending client platform 110 using an email client program 220, also known as a Mail User Agent. When an email message is sent from the email client program 220, such as to receiving client platform 140, the transmission is intercepted by the plug-in code 230 running on the client platform 110.

If the plug-in code 230 detects that a virtual email address is used for one or more of the recipients of the email message, the plug-in code 230 resolves the virtual email addresses of the recipients and replaces each virtual address with its corresponding actual email address. The details of this resolution process are discussed more fully below. The plug-in code 230 can also place the originating virtual email address in the REPLY-TO header field of the email message if that field is empty. The details of embodiments of the invention directed to manipulating header fields in messages are described more fully below with reference to FIGS. 3 and 4.

In another exemplary embodiment of the invention, the plug-code 230 assigns an X-VIRTUAL-TO header field in the message for each resolved virtual recipient address. Each X-VIRTUAL-TO field contains a virtual address and the actual address to which it was resolved. If the originating email address can also be a virtual address, then the plug-in assigns that virtual address and its corresponding actual address to an X-VIRTUAL-FROM field. If the REPLY-TO header field can be a virtual address, then the plug-in assigns that virtual address and its corresponding actual address to an X-VIRTUAL-REPLY-TO field. The X-VIRTUAL-TO, X-VIRTUAL-FROM and X-VIRTUAL-REPLY-TO email message header fields are introduced by this invention and conform to the extension mechanism defined in Internet Engineering Task Force RFC 2822.

Once all virtual addresses have been replaced by actual addresses, the plug-in code 230 sends the email message to a sending email server 120, also known as a Mail Transfer Agent, and the delivery of the email message proceeds. From this point on, the transmission and receipt of the email message is conventional. Specifically, the email message passes to email server 130. During passage, the email message can travel through one or more intermediate servers (not shown). Using existing and well known protocols, the email client 260 running on the receiving client platform 140 can retrieve the email message that was originally addressed to a virtual address and sent to an actual address.

In another exemplary embodiment of the invention wherein the industry standard plug-in code 230' runs on the sending server platform 120. Email processing using virtual addresses is the same as described above, except that the plug-in code 230' resides on and executes on the sending server platform 120.

In another exemplary embodiment of the invention, the industry standard plug-in code 230, 230' runs on the sending client platform 110 and on the sending server platform 120. In this embodiment, email processing using virtual addresses can behave as if the plug-in code 230 is only resident on the client platform 110, or as if the plug-in code 230' is only resident on the server platform, or some combination of the two.

One aspect of the invention is the ability of the plug-in code 230 executing on client platform 110 to detect an operational plug-in code 230' executing on server platform 120 when an outgoing message is processed at client platform 110. In one aspect of the invention, the Simple Mail Transfer Protocol (SMTP) extensibility framework specified in Internet Engineering Task Force RFC 2821 can be used by the plug-in code 230 executing on client platform 110 to detect an operational plug-in code 230' executing on server platform 120. Before the first outgoing email message is sent from the client platform 110, the plug-in code 230 issues an Extended Hello (EHLO) command to ascertain whether or not plug-in code 230' is operational on the server platform 120. If the plug-in code 230' is operational, server platform 120 modifies the SMTP response to the EHLO to indicate that the service extension for virtual addresses is active on the server platform 120.

When plug-in code 230 executing on the client platform 110 detects that plug-in code 230' is operational on a server platform 120, the plug-in code 230 can allow the plug-in code 230' executing on the server platform 120 to handle none, part, or all of the outgoing virtual address resolution operations. The plug-in code 230 can be configured to handle all outgoing virtual address resolution work by performing the work as if the plug-in code 230' was not operational on the server platform 120. In another exemplary embodiment of the invention, the plug-in code 230 handles some outgoing virtual address resolution work and leaves the rest of the work to be subsequently discovered and performed by the plug-in code 230' running on the server platform 120. In yet another exemplary embodiment of the invention, the plug-in code 230 chooses to handle no outgoing virtual address resolution work causes the plug-in code 230' running on the server platform 120 to execute as if there was no operational plug-in code 230 executing on the client platform 110. In all of the aforementioned embodiments relating to FIG. 2, after an email message passes from the client platform 110 and through the server platform 120, the message is transmitted to the receiving client platform 140 using conventional means.

With continuing reference to FIG. 2, there is illustrated an exemplary embodiment of the invention wherein the industry standard plug-in code 230, 230" runs on client platform 110 and on receiving client platform 140. While described with the plug-in code 230, 230" running on the two client platforms 210, 140, embodiments of the invention are not limited to a client-only configuration. In operation, as described above, any combination of sending platforms 110, 120 and receiving platforms 130, 140 can be utilized.

In the illustrated exemplary embodiment, the virtual addresses in outgoing email messages are processed on sending client 110 and server 120 as described in the previous exemplary embodiments. However, in the illustrated embodiment, there is additionally performed reverse virtual address resolution on incoming email messages. This reverse resolution replaces actual addresses in the email message with the virtual addresses that were present in the originally composed email message.

In one exemplary embodiment, the X-VIRTUAL-TO, X-VIRTUAL-FROM and X-VIRTUAL-REPLY-TO header fields inserted into the outgoing email message by the sending plug-in code 230 are used to perform the reverse resolution. In another exemplary embodiment, the mapping of virtual addresses to actual addresses is defined to be invertible, so that the receiving plug-in code 230" can use the same mechanism to perform actual-to-virtual address translations as is used to perform virtual-to-actual translations.

An email message is composed in an email client program 220 on sending client platform 110. The processing of the sending plug-in code 230 and the various servers 120, 130 is the same as discussed above. When the email message arrives at the receiving client platform 140, the plug-in code 230" intercepts the transmission. The plug-in code 230" uses the reverse resolution mechanism to replace actual addresses in the message with the virtual addresses that were originally in the message. Thus, the receiving plug-in code 230" undoes the changes performed earlier by the sending plug-in code 230.

Reverse resolution substitutions are performed on a best effort basis. Specifically, failure to resolve every actual address to a corresponding virtual address does not result in an error. Failure to resolve every actual address results in an acceptable condition wherein actual addresses stay in the message delivered to the receiving email client program 260. After reverse resolution is performed, the receiving email client program does not distinguish between virtual and actual addresses.

Figure 3:
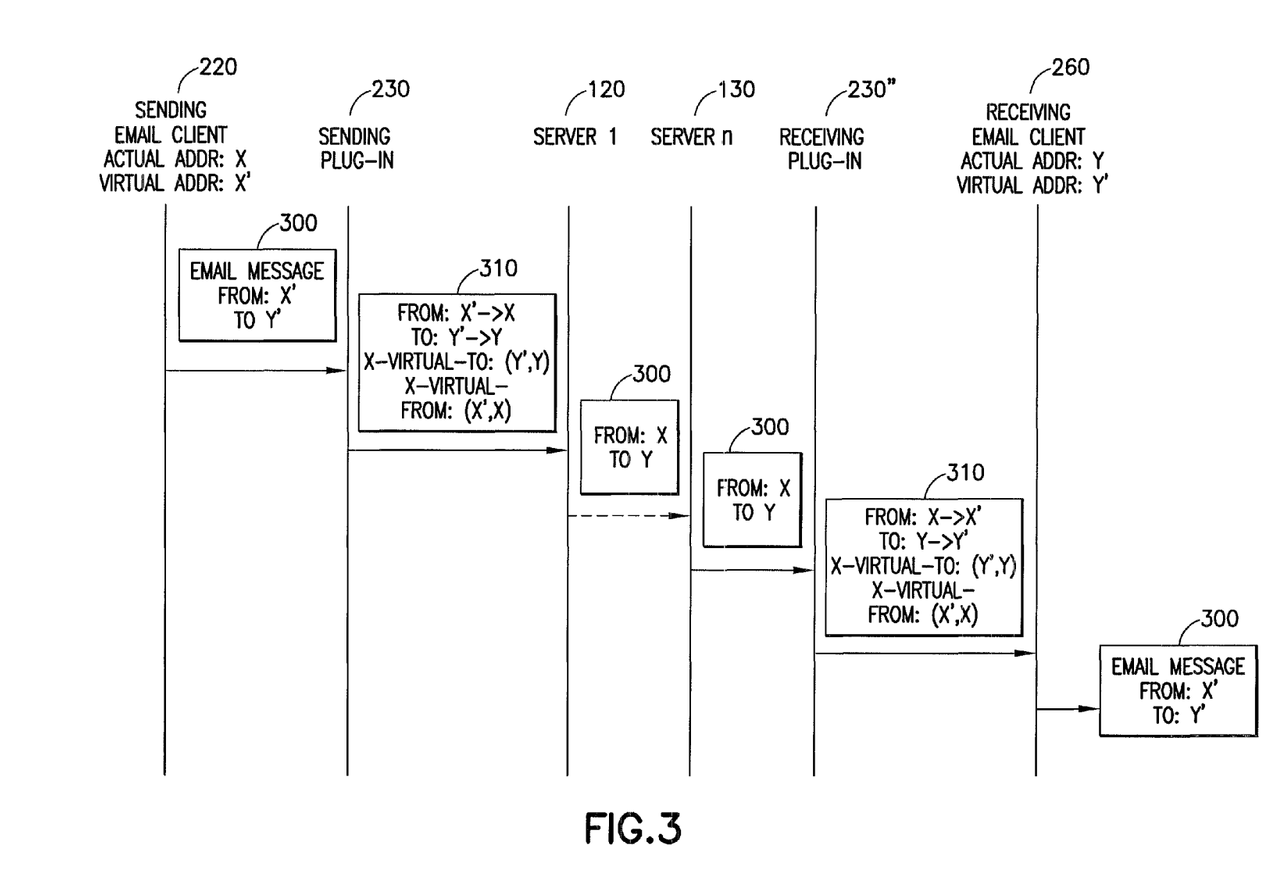
FIG. 3 is a diagram of an exemplary embodiment of the address translation of the invention.

With reference to FIG. 3, there is illustrated an exemplary embodiment of the invention showing details of virtual address translation for an outgoing email message 300. The sending client platform 110 has an actual email address X and a virtual email address X'. The receiving client platform 140 has an actual email address Y and a virtual email address Y'. In this exemplary embodiment, a user composes an email message 300 using the email client 220 on the sending client platform 110 (not shown), specifying virtual email addresses for both the sending and receiving clients. Specifically, the email message 300 has Y' assigned to its TO header field and X' assigned to its FROM header field. When the email message 300 is sent, the sending client plug-in code 230 intercepts the email message 300 and performs virtual address resolution. The plug-in code 230 maps virtual address X' to actual address X and maps virtual address Y' to actual address Y in header 310, portions of which are shown.

As previously noted, the sending client plug-in code 230 can also insert the optional header fields X-VIRTUAL-TO and X-VIRTUAL-FROM in header 310. In this example, X-VIRTUAL-TO contains the tuple (Y', Y) and X-VIRTUAL-FROM contains the tuple (X', X). While described with reference to various particular header fields, the invention is not so limited. Rather, it is generally understood that an email message 300 is comprised of a volume of data including, but not limited to, textual data and header fields. The invention is broadly drawn to encompass any and all email message 300 formats including an address of origin and a destination address, whether virtual or actual, and any and all accompanying header fields. The outgoing email message 300 is then sent to one or more Mail Transfer Agents 120, 130 for delivery to the receiving client platform 140 (not shown).

As described above, at this point, the TO and FROM header fields in the email message 300 have the values Y and X, respectively.

The receiving client plug-in code 230" intercepts the incoming email message 300 and performs reverse virtual address resolution. Using the X-VIRTUAL-TO and X-VIR-TUAL-FROM header fields, the plug-in code 230" maps actual email address X to virtual email address X' and maps actual email address Y to virtual email address Y'. After reverse resolution, the email message TO and FROM fields are restored to the value they contained when the email message 330 was originally composed. The email message is then passed to the receiving email client 260.

Figure 4:
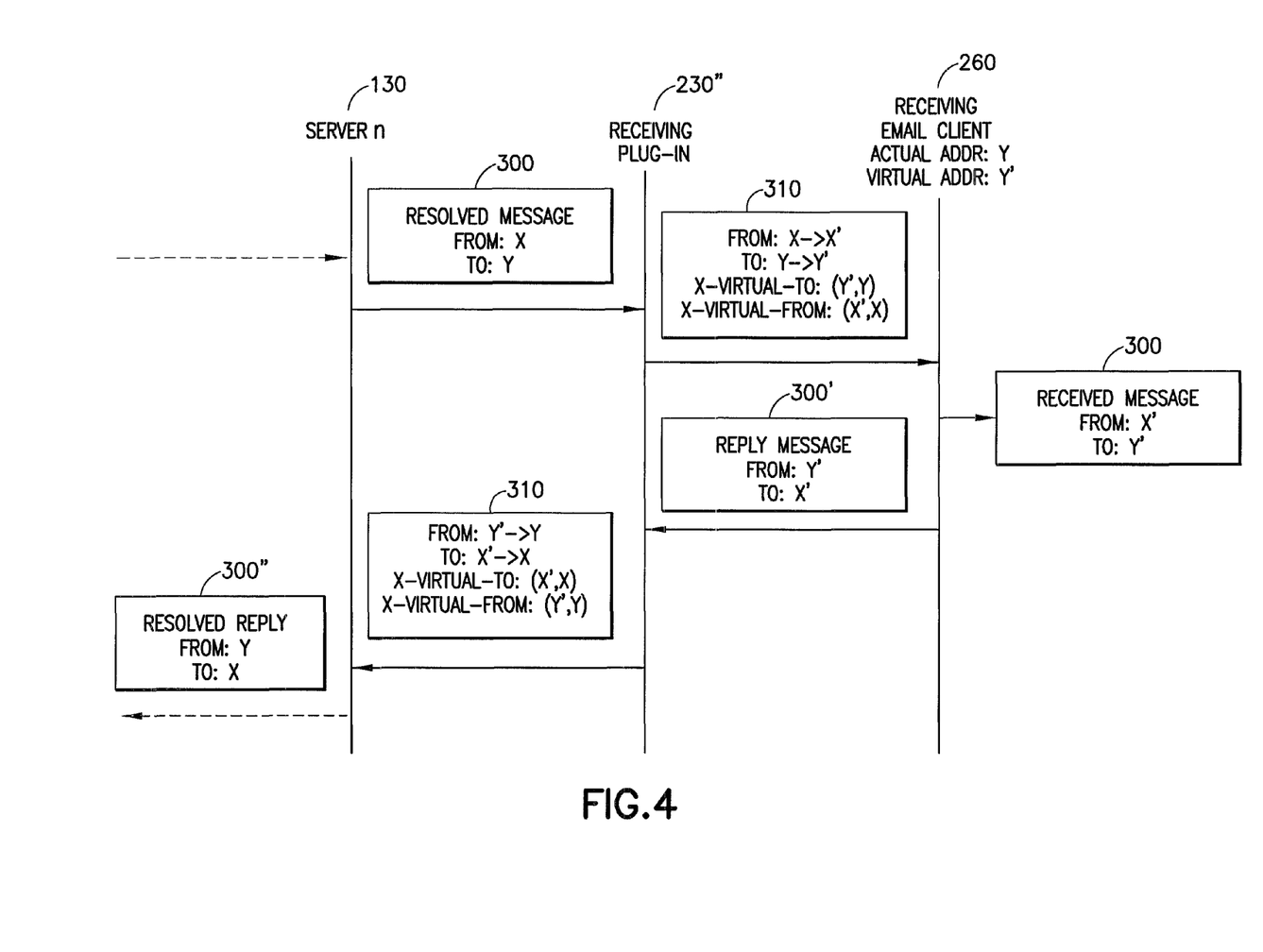
FIG. 4 is a diagram of an exemplary embodiment of the invention illustrating address translation in a reply email message.

With reference to FIG. 4, there is illustrated the completion of an email message 300 round trip whose first leg was illustrated in FIG. 3. The receiving client platform 140 (not shown) receives the email message 300 as described with reference to FIG. 3 and composes a reply email message 300 using email client 260. The reply email message 300' is initialized with the virtual email addresses from the received email 300 The reply email message's 300' TO header field contains X' and its FROM header field contains Y'. When the reply email message 300' is sent, the replying client plug-in code 230" performs virtual address translation, mapping virtual address X' to actual address X, and virtual address Y' to actual address Y. The plug-in code 230" also inserts the optional X-VIRTUAL-TO and X-VIRTUAL-FROM header fields as described with reference to FIG. 3. The modified reply message 300" is delivered via Mail Transfer Agent 130 in the conventional way. The exemplary embodiments described with reference to FIGS. 3 and 4 demonstrate how the invention provides complete virtual address transparency to sender and receiver clients during roundtrip communication. It is to be understood that this detailed explanation of the operation of virtual address translation according to the above noted exemplary embodiment of the invention can be extended to the operation of plug-in code 230 operating on any client or server platform.

To support the resolution process described above, it is noted that virtual email addresses possess, at a minimum, three properties. First, a virtual address is associated with only one actual email address. Second, an email address must be recognizable as a virtual address using a defined algorithm. Such an algorithm can distinguish virtual email addresses from actual email addresses. Third, a virtual address encodes information within itself such that a well-defined virtual address resolution protocol can be used to map a virtual address to its associated actual address. The resolution protocol defines the steps necessary to perform the mapping.

In one exemplary embodiment, virtual addresses are mapped to exactly one actual address, but different virtual addresses can be mapped to the same actual address. In another exemplary embodiment, virtual addresses are mapped to exactly one actual address and that actual address cannot be mapped to by any other virtual address. This 1-to-1 mapping between virtual and actual addresses allows for a reverse resolution protocol in which an actual address can be resolved to a virtual address. In another exemplary embodiment, the mapping between virtual and actual addresses can be performed by a mapping function and the reverse resolution protocol is supported if that function has an inverse. In general, address mappings can be kept in a persistent store.

In one exemplary embodiment, virtual email addresses are recognized by using an extended email address encoding scheme. Such encoding allows virtual email addresses to be distinguished from actual email addresses. As used herein, "extended email address encoding" refers to the use of a character sequence that is illegal, or non-conforming, in Internet email addresses to detect virtual addresses. For example, one can define a convention of following the AT sign "@" in an email address with a designated punctuation character, such as an exclamation point, "!", to distinguish virtual email addresses, such as the following: myalias@!aliases.com.

In another exemplary embodiment, virtual email addresses are recognized by using a domain name encoding in which a new top-level domain name in the Domain Name System (DNS) is reserved for virtual email addresses. For example, the top-level domain "email" is used in the following address to indicate a virtual email address: myalias@aliases.com.e-mail. When using domain name encoding, the new top-level domain name does not need to be an assigned IP address or to exist as standard DNS name lookups will not be applied to them.

Once an alias e-mail address encoding scheme is chosen through common agreement or formal standards, plug-in code 230 is constructed to be capable of detecting virtual email addresses created according to one or more of these schemes. Once detected, a plug-in code 230 resolves the virtual address. In another exemplary embodiment, the resolution protocol reads actual addresses from a file or look-up table (not shown) accessible to the plug-in code 230.

Figure 5:
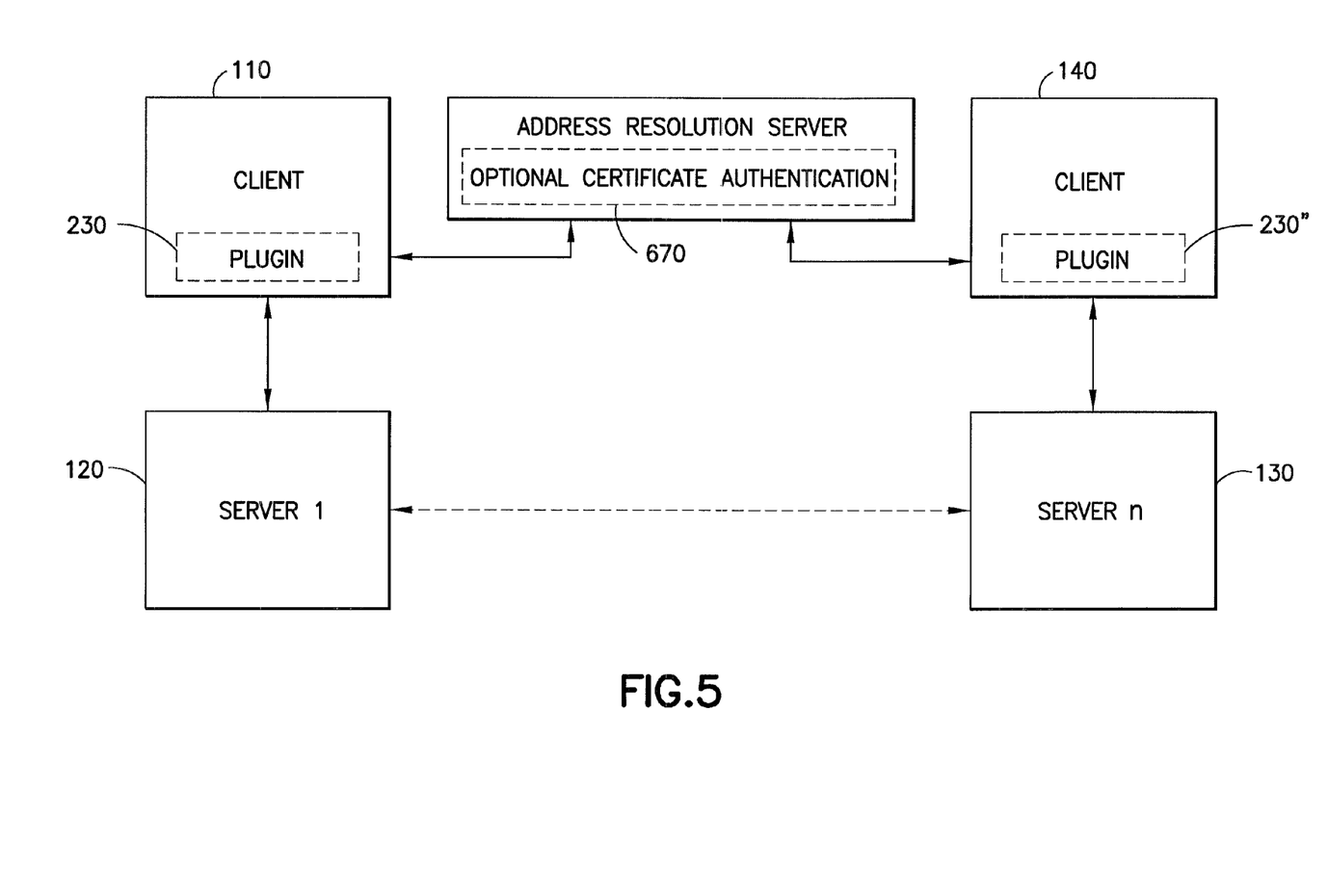
FIG. 5 is an illustration of the process of virtual address resolution using a resolution server according to an exemplary embodiment of invention.

With reference to FIG. 5, there is illustrated an exemplary embodiment of the invention wherein the resolution protocol specifies that the plug-in code 230 communicate with a resolution server 670 to acquire actual email addresses. This resolution server 670 can be attached to a private network or to the Internet.

Resolution servers 670 are independently administered and distributed throughout the Internet. In the embodiment shown, a simple transformation of the virtual email address can be used to determine the resolution server 670. For example, if the extended e-mail address encoding described above is used, then the resolution server 670 can be identified by the DNS name that follows the exclamation point. On the other hand, if the domain name encoding is used, then the resolution server 670 name follows the AT sign and excludes the last dot and the top-level domain name. Thus, the resolution server for the myalias@aliases.com.email example is aliases.com.

Once the network location of the resolution server 670 is known, the plug-in code issues a virtual address resolution request to the resolution server 670. In general, this request contains one or more virtual addresses, each of which needs to be mapped to an actual email address. The resolution server 670 listens for resolution requests. Once a request is received, the resolution server 670 attempts to map each virtual address alias to its actual e-mail address. The resolution server 670 returns to the requester plug-in 230, 230" the mapping result, which might be an error code, for each alias in the request. In addition, certificate authentication may be performed on the resolution server 670.

After an alias has been resolved, the plug-in code 230, 230" substitutes actual email addresses for virtual email addresses in the email message. The plug-in code 230, 230" then interacts with a Mail Transfer Agent server 120, 130 as if virtual addressing was not used. The plug-in code 230, 230" can cache virtual address mappings to improve performance.

A business model in which Portable Internet Email Address Service Providers (PIEMAPs) guarantee that the virtual addresses they maintain can be supported even if the provider itself ceases to operate. Such a guarantee can be made using legal and financial mechanisms. For example, the guarantee can be supported through mechanisms similar to underwriting in the insurance industry: groups of PIEMAPs mutually guarantee to support each other's virtual addresses in case any member of the provider group fails. These types of arrangements mean that PIEMAPS have a fiduciary responsibility to maintain its clients' virtual addresses in perpetuity.

As described above, the invention improves the efficiency of a conventional email forwarding system by eliminating the need to send the same email message multiple times, improves security by minimizing the number of intermediate servers some email messages traverse, lessens administrative overhead and server load at some email providers that regularly perform email address forwarding, such as universities that maintain student forwarding addresses, and improves the reliability of email addresses by avoiding loss of service when a forwarding service goes out of business or discontinues operations.

Thus, it should be appreciated that the foregoing description has provided by way of exemplary and non-limiting examples a full and informative description of the best method and apparatus presently contemplated by the inventor for carrying out the invention. However, various modifications and adaptations may become apparent to those skilled in the relevant arts in view of the foregoing description, when read in conjunction with the accompanying drawings and the appended claims. However, all such modifications of the teachings of this invention will still fall within the scope of this invention. Further, while the method and apparatus described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof, as this invention is defined by the claims which follow.

What is claimed is:

1. A computer readable memory medium tangibly embodying a program of machine-readable instructions executable by a digital processing apparatus to cause the digital processing apparatus to perform operations comprising:
    performing the following on a client platform:
        receiving, from an email client executing on the client platform, an original email message to be transmitted from the client platform, the original email message having an original header comprising a "from" header field and a "to" header field, the "to" header field having a virtual receiving email address, the "from" header field having a virtual sending email address;
        resolving said virtual receiving email address to an actual receiving email address and said virtual sending email address to an actual sending email address;
        creating a revised email message from the original email message by:
        replacing the virtual receiving email address in the "to" header field of the original email message with the actual receiving email address;
        replacing the virtual sending email address in the "from" header field of the original email message with the actual sending email address;
        inserting a "virtual from" header field and a "virtual to" header field into the original header of the email message to create a revised header for the revised email message;
        inserting a tuple comprising the virtual sending email address and the actual sending email address into the "virtual from" header field; and
        inserting a tuple comprising the virtual receiving email address and the actual receiving email address into the "virtual to" header field; and
        transmitting said revised email message, including said revised header having the "to", "from", "virtual from", and "virtual to" header fields, to an email server external to the client platform.

2. The computer readable memory medium of claim 1 wherein at least one of said virtual receiving email address or said virtual sending email address comprises a reserved top-level domain name.

3. The computer readable memory medium of claim 1 wherein said virtual receiving email address comprises a punctuation character adjacent to an AT (@) sign.

4. The computer readable memory medium of claim 1 wherein resolving comprises:
    sending a request to resolve said virtual receiving email address and said virtual sending email address to a resolution server; and
    receiving from said resolution server the actual receiving email address corresponding to said virtual receiving email address and the actual sending email address corresponding to said virtual sending email address.

5. The computer readable memory medium of claim 1 wherein resolving comprises mapping the virtual receiving email address to the actual receiving email address and mapping the virtual sending email address to the actual sending email address using a translation method retrieved from a memory.

6. The computer readable memory medium of claim 1 wherein resolving comprises utilizing an address lookup table.

7. A computer readable memory medium tangibly embodying a program of machine-readable instructions executable by a digital processing apparatus to cause the digital processing apparatus to perform operations comprising:
    performing the following on a client platform:
        receiving an original email message from an email server external to the client platform, the original email message comprising an original header comprising a "to" header field, a "from" header field, a "virtual from" header field, and a "virtual to" header field, the "to" header field having an actual receiving email address, the "from" header field having an actual sending address, the "virtual from" header field, comprising a tuple comprising a virtual sending email address and the actual sending email address and the "virtual to" header field comprising a tuple comprising a virtual receiving email address and the actual receiving email address;
        using the "virtual from" header field, resolving said actual receiving email address to the virtual receiving email address;
        using the "virtual to" header field, resolving said actual sending email address to the virtual sending email address;
        creating a revised email message by:
        replacing the actual receiving email address in the "to" header field of the original email message with the virtual receiving email address;
        replacing the actual sending email address in the "from" header field of the original email message with the virtual sending email address;

removing the "virtual from" header field and the "virtual to" header field from the original header of the email message to create a revised header for the revised email message; and communicating said revised email message, including the revised header, to an email client executing on the client platform.

8. The computer readable memory medium of claim 7 wherein at least one of said virtual receiving email address or said virtual sending email address comprises a reserved top-level domain name.

9. The computer readable memory medium of claim 7 wherein at least one of said virtual receiving email address comprises a punctuation character adjacent to an AT (@) sign.

10. A method comprising:
performing the following on a client platform:
receiving, from an email client executing on the client platform, an original email message to be transmitted from the client platform, the original email message having an original header comprising a "from" header field and a "to" header field, the "to" header field having a virtual receiving email address, the "from" header field having a virtual sending email address;

resolving said virtual receiving email address to an actual receiving email address and said virtual sending email address to an actual sending email address;

creating a revised email message from the original email message by:
replacing the virtual receiving email address in the "to" header field of the original email message with the actual receiving email address;
replacing the virtual sending email address in the "from" header field of the original email message with the actual sending email address;
inserting a "virtual from" header field and a "virtual to" header field into the original header of the email message to create a revised header for the revised email message;
inserting a tuple comprising the virtual sending email address and the actual sending email address into the "virtual from" header field; and
inserting a tuple comprising the virtual receiving email address and the actual receiving email address into the "virtual to" header field; and
transmitting said revised email message, including said revised header having the "to", "from", "virtual from", and "virtual to" header fields, to an email server external to the client platform.

11. The method of claim 10, wherein resolving comprises:
sending a request to resolve said virtual receiving email address and said virtual sending email address to a resolution server; and
receiving from said resolution server the actual receiving email address corresponding to said virtual receiving email address and the actual sending email address corresponding to said virtual sending email address.

12. A method comprising:
performing the following on a client platform:
receiving an original email message from an email server external to the client platform, the original email message comprising an original header comprising a "to" header field, a "from" header field, a "virtual from" header field, and a "virtual to" header field, the "to" header field having an actual receiving email address, the "from" header field having an actual sending address, the "virtual from" header field, comprising a tuple comprising a virtual sending email address and the actual sending email address and the "virtual to" header field comprising a tuple comprising a virtual receiving email address and the actual receiving email address;
using the "virtual from" header field, resolving said actual receiving mail address to the virtual receiving email address;
using the "virtual to" header field, resolving said actual sending email address to the virtual sending email address;
creating a revised email message by:
replacing the actual receiving email address in the "to" header field of the original email message with the virtual receiving email address;
replacing the actual sending email address in the "from" header field of the original email message with the virtual sending email address;
removing the "virtual from" header field and the "virtual to" header field from the original header of the email message to create a revised header for the revised email message; and
communicating said revised email message, including the revised header, to an email client executing on the client platform.

* * * * *